United States Patent
Lescuyer et al.

(10) Patent No.: US 8,825,998 B2
(45) Date of Patent: Sep. 2, 2014

(54) SECURITY CONTROL IN A COMMUNICATION SYSTEM

(75) Inventors: Pierre Lescuyer, Montigny le Bretonneux (FR); Thierry Lucidarme, Montigny le Bretonneux (FR)

(73) Assignee: BlackBerry Limited, Waterloo (CA)

( * ) Notice: Subject to any disclaimer, the term of this patent is extended or adjusted under 35 U.S.C. 154(b) by 2095 days.

(21) Appl. No.: 11/787,498

(22) Filed: Apr. 17, 2007

(65) Prior Publication Data

US 2008/0072034 A1    Mar. 20, 2008

(30) Foreign Application Priority Data

Apr. 18, 2006  (EP) .................................... 06290625

(51) Int. Cl.
*H04L 29/06*    (2006.01)
(52) U.S. Cl.
CPC .......... *H04L 63/0428* (2013.01); *H04L 63/105* (2013.01)
USPC ............. 713/153; 713/166; 713/168; 726/26; 380/258; 455/456.1; 455/410
(58) Field of Classification Search
USPC ............. 713/153, 166, 168; 726/26; 380/258; 455/456.1, 410
See application file for complete search history.

(56) References Cited

U.S. PATENT DOCUMENTS

| | | | |
|---|---|---|---|
| 5,602,916 A * | 2/1997 | Grube et al. .................. | 380/270 |
| 6,125,446 A * | 9/2000 | Olarig et al. ....................... | 726/8 |
| 7,293,088 B2 * | 11/2007 | Douglas et al. ................ | 709/224 |
| 2003/0140246 A1 | 7/2003 | Kammer et al. | |
| 2005/0058138 A1 * | 3/2005 | Bucher et al. ............. | 370/395.42 |
| 2005/0097320 A1 * | 5/2005 | Golan et al. ................... | 713/166 |
| 2006/0156385 A1 * | 7/2006 | Chiviendacz et al. ............ | 726/2 |
| 2008/0148043 A1 * | 6/2008 | Lucidarme et al. ............ | 713/155 |

FOREIGN PATENT DOCUMENTS

GB          2 411 554          8/2005

OTHER PUBLICATIONS

Voloshynovskiy, S.; et al; "Information-theoretic data-hiding for public network security, services control and secure communications"; Telecommunications in Modern Satellite, Cable and Broadcasting Service, 2003. TELSIKS 2003. 6th International Conference on vol. 1;Publication Year: 2003; pp. 3-17 vol. 1.*
Kong ,Jiejun; et al.; "Providing real-time security support for multi-level ad-hoc networks"; MILCOM 2002. Proceedings vol. 2; Digital Object Identifier: 10.1109/MILCOM.2002.1179677; Publication Year: 2002 , pp. 1350-1355 vol. 2 IEEE Conference Publications.*
N. Edwards et al., "WWI Whitepaper on Trust Version 1," XP-002404231, Sixth Framework Programme Mobile and Wireless Systems Beyond 3G, WWI Ambient Networks, pp. 0-20 (Oct. 6, 2004).
EP Search Report for EP 06 29 0625, pp. 1-2 (Oct. 24, 2006).

* cited by examiner

*Primary Examiner* — Hadi Armouche
*Assistant Examiner* — Angela Holmes

(57) ABSTRACT

A method includes controlling security in a communication system that involves a node capable of routing traffic according to one or more security algorithms with respective security levels. The node is adapted to estimate at least one safety degree relating to the node, to select at least one security algorithm of the one or more security algorithms, depending on the estimated safety degree; and to activate the at least one security algorithm.

12 Claims, 2 Drawing Sheets

SECURITY CONTROL IN A COMMUNICATION SYSTEM

CROSS-REFERENCE TO RELATED APPLICATION

This claims priority under 35 U.S.C. §119 of EP Patent Application No. EP 06290625.0, filed Apr. 18, 2006, which is hereby incorporated by reference.

TECHNICAL FIELD

The present invention relates to security control in a communication system.

BACKGROUND

It is common to apply security algorithms, such as authentication, ciphering and integrity algorithms, in a communication system comprising one or several nodes.

In some cases, security algorithms with a low security level can be sufficient. This is the case, for instance, for a node located in a safe place, such as a firm whose access is tightly controlled. The implementation of such low security level algorithms is advantageous in particular because it avoids unnecessary and complex processing and limits power consumption in the node.

In some other cases however, security algorithms with a higher security level are necessary. This is the case, for instance, for a node often subjected to security attacks by hackers.

A problem is that the security algorithms must sometimes be implemented in a node without knowing how the node will be used. For example, the node may be built well before it is placed in a communication system.

Even when the destination of a given node is known in advance, there is no guarantee that the safety degree of this node will not evolve in the course of time. For example, if the node comprises a mobile device, it may move from a safe place to a non safe place.

Moreover, if the communication system comprises several interconnected nodes, the security level to be applied to a given node could be impacted by other nodes of the communication system. For instance, if said given node is not directly subjected to attacks but is connected to a poorly protected other node, it should preferably implement high security level algorithms.

SUMMARY OF THE INVENTION

An object of the present invention is to overcome the above mentioned disadvantages.

Another object is to obtain a security level in a communication system which is well adapted to the actual risks.

The invention proposes a method of controlling security in a communication system comprising at least one node capable of routing traffic according to a plurality of security algorithms with respective security levels. The method comprises the following steps:
  estimating at least one safety degree relating to said node;
  selecting at least one security algorithm of said plurality, depending on said estimated safety degree; and
  activating said at least one security algorithm.

The security applied to the traffic routed by the node is thus adapted to the safety situation of the node.

Advantageously, the security algorithm selection is such that at least one security algorithm with a relatively low security level is selected when said estimated safety degree is relatively high and at least one security algorithm with a relatively high security level is selected when said estimated safety degree is relatively low.

In this way, the security level applied to the traffic routed by the node is higher when the safety situation of the node is poor, i.e. when security is really necessary. But, a low security level is applied when the risks are low.

The safety degree estimation advantageously takes account of one or several of the following criteria: a type of location in which said node is placed, a number of security attacks said node had to face in a previous time period, a type of the security attacks said node had to face in a previous time period and subscription or equipment characteristics at least part of the traffic to be routed by said node relates to.

Several safety degrees can be estimated for respective flows forming the traffic to be routed by the node.

The invention also proposes a node capable of routing traffic in a communication system according to a plurality of security algorithms with respective security levels. The node comprises:
  an estimation module for estimating at least one safety degree relating to said node;
  a selection module for selecting at least one security algorithm of said plurality, depending on said safety degree estimated by the estimation module; and
  an activation module for activating said at least one security algorithm selected by the selection module.

The invention also proposes a communication system comprising a plurality of nodes as mentioned above, each node being connected to at least another node of said plurality.

The invention also proposes a computer program product comprising code instructions for carrying out the method as mentioned above, when loaded and executed in at least one node of a communication system.

The preferred features of the above aspects which are indicated by the dependent claims may be combined as appropriate, and may be combined with any of the above aspects of the invention, as would be apparent to a person skilled in the art.

DESCRIPTION OF PREFERRED EMBODIMENTS

The present invention takes place in a communication system comprising at least one node, i.e. a communication point capable of routing traffic. The communication system may use any type of communication protocol or technology.

Figure 1:
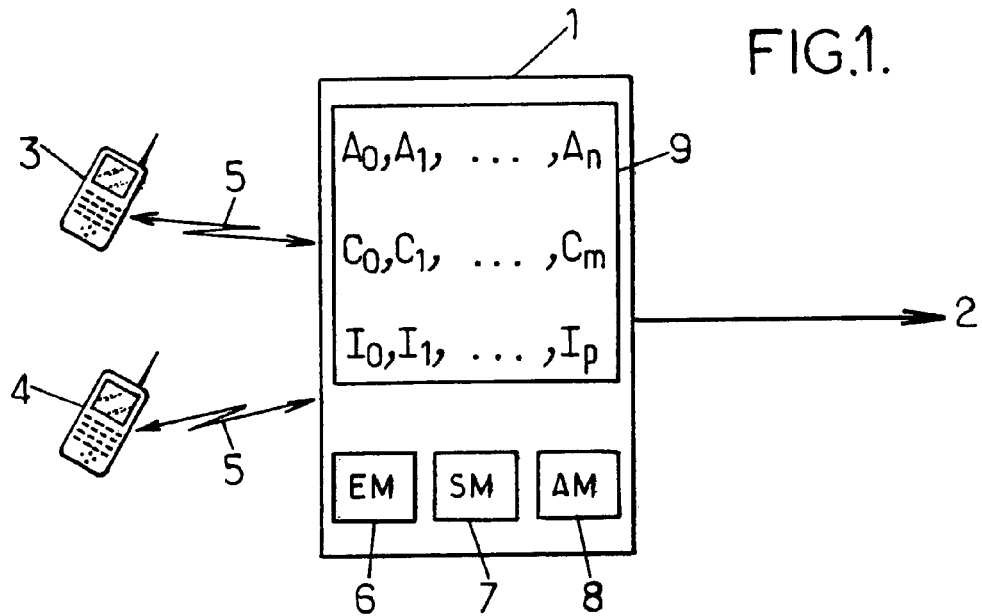
FIG. 1 shows a single node communication system in which the invention can take place.

In the example illustrated in FIG. 1, the communication system consists in one node 1 which is an access point. This node 1 receives information from mobile terminals 3 and 4 over radio channels 5 and forwards it to another system 2, such as an IP network. The communication protocol used may be a WLAN (Wireless Local Area Network) protocol such as 802.11b for instance, or any other protocol.

The node 1 can consist in a single device, such as a router or a communication terminal. Alternatively, it can comprise several devices by itself. Advantageously, the node 1 can be whole or part of an Ambient network.

By contrast with nodes of the prior art, the node 1 implements several security algorithms 9 having respective security levels.

As illustrated in FIG. 1, these algorithms 9 can include at least ones of authentication algorithms ($A_0, A_1, \ldots, A_n$) so as to validate that traffic routed to the other system 2 was really sent by the node 1 (the authentication algorithms can also operate in the reverse direction, i.e. to check who sent traffic received by the node 1), ciphering algorithms ($C_0, C_1, \ldots, C_m$) so as to make the traffic routed by the node 1 unreadable to non authorized users (the ciphering algorithms can also operate in the reverse direction, i.e. to decipher traffic received by the node 1) and integrity algorithms ($I_0, I_1, \ldots, I_p$) so as to allow checking that traffic routed to the other system 2 (or to check that traffic received by the node 1) was not corrupted during transmission or processing, where n, m and p represent integers. Other types of security algorithms could be implemented as well.

In what precedes, the index 0 corresponds to the algorithms having the lowest security level, whereas the highest indexes n, m and p corresponds to the algorithms having the highest security level.

Any known security algorithm can be used to this end. For example, simple authentication algorithms can include the use of logins/passwords with various lengths, whereas more robust authentication algorithms can include public key algorithms or secret key algorithms with more or less long size. For instance, in case of AES in symmetric cryptography, key length may vary from 128 to 256 bits. In case of asymmetric cryptography, public key may involve PKI and X509 certificates distribution as standardized by the ITU (international Telecommunication Union). More than one certificate may also be used in some high level security algorithms. The use of a zero knowledge (ZK) type algorithm with a lot of challenge-responses rounds constitutes a further example of a robust algorithm.

As to ciphering, public or private key with a more or less long size (e.g. 128 or 258 bits) can be used. Ciphering algorithms such as ANSI (American National Standards Institute) standard DES (Data Encryption Standard), the NIST (National Institute of standards and Technology) standard AES (Advanced Encryption Standard) or the RSA (Rivest, Shamir and Adleman) cryptosystem can be implemented for instance.

Biometry could be used in addition as well known in the art, e.g. coupled with a login/password based authentication.

Using more than one method of authentication successively is called "strong authentication".

As to integrity, parity check codes with various lengths could be used for instance. More complex algorithms as well known in the art may be suitable as well.

It should be noted that a same authentication, ciphering or integrity algorithm can be made more or less robust by use of a more or less long key. In this way, the use of a long key will result in a relatively high security level, while the use of a short key will result in a relatively low security level. As an example, for authentication or ciphering, a public key RSA algorithm can be chosen with a modulo of 1024 bits as a robust algorithm and with a modulo of 2048 bits as an even more robust algorithm.

By contrast, different algorithms can be implemented for respective security levels. As an example, 3-DES is more robust than the DES algorithm. Likewise, AES offers a higher security level than DES, for a given key length.

Back to the example illustrated in FIG. 1, the node 1 comprises several modules which can comprise physical units or software programs. In particular, it comprises an estimation module EM 6 which is arranged for estimating at least one safety degree relating to the node. This safety degree estimation can be performed in different ways that can be independent or combined with each other.

It can indeed take account of a type of location in which the node 1 is placed. For instance, if the node 1 is located in a safe place, such as a firm with limited and controlled access, the safety degree relating to the node 1 could be estimated as high. By contrast, if the node 1 is located in an unsafe place, such as a public place (e.g. train station, airport, etc.) or a place known to be subjected to attacks by hackers, the safety degree relating to the node 1 could be estimated as low.

The type of location the node 1 is placed in can be predetermined. It can also be determined at successive instants, especially when the node 1 comprises a mobile device such as a mobile terminal. It is indeed possible that such mobile terminal moves from and to safe/unsafe places successively in the course of time.

The safety degree estimation performed by the EM 6 can also take account of a number of security attacks the node 1 had to face in a previous time period. To this end, the node 1 may store or have access to a log history file containing a trace of each security attack occurred with the node 1 during said previous time period. As an example, if an access to the node 1 by each mobile terminal 3-4 starts with a mutual authentication procedure, the log history file may contain each attempt to access for which the authentication has failed.

One can thus understand that the EM 6 will estimate a safety degree according to the number or proportion of attacks towards the node 1, as indicated by said log history file for instance.

Of course, such safety degree estimation by the EM 6 can be performed several times for successive time periods, so as to obtain an updated value, in particular when the node 1 is moving.

The safety degree estimation performed by the EM 6 can also take account of the type of security attacks the node 1 had to face in a previous time period.

As an example, the well known WiFi technology comprises two steps preliminary to an association between a terminal and a base: a "probe request" step which allows the terminal to get some level 2 information relating to the MAC ("medium access control") layer and an authentication step most often performed by use of a password. Some DoS (denial-of-service) type attacks can create disturbance by continuously repeating probe requests, in order to overload the communication channel with the base. These attacks have about no effect on neighbor bases. Some other attacks can be intrusive by submitting wrong passwords which endangers the security of the whole network. In such example, it is advantageous to know what kind of attacks the considered base is facing, so as to estimate a relevant safety degree accordingly.

The safety degree estimation performed by the EM 6 can also take account of subscription or equipment characteristics, at least part of traffic to be routed by the node 1 relates to. As an example, if the mobile terminal 3 of FIG. 1 is a model known to be safe (e.g. since its software is protected from access) whereas the mobile terminal 4 of FIG. 1 is a model known to be unsafe, the EM 6 can estimate two safety degrees relating to the node 1: one high safety degree with respect to the traffic coming from the mobile terminal 3 and one low safety degree with respect to the traffic coming from the mobile terminal 4.

Likewise, if the mobile terminal 3 of FIG. 1 is used by a subscriber of an access or service provider known to be safe (e.g. since it includes its own security algorithms) whereas the mobile terminal 4 of FIG. 1 is used by a subscriber of an access or service provider known to be unsafe (e.g. since it is used by many hackers), the EM 6 can estimate two safety degrees relating to the node 1: one high safety degree with respect to the traffic coming from the mobile terminal 3 and one low safety degree with respect to the traffic coming from the mobile terminal 4.

More generally, the EM 6 can estimate different safety degrees for respective flows composing the traffic to be routed by the node 1. For instance, whatever the characteristics of the mobile terminals 3 and 4 may be, two safety degrees could be estimated by the EM 6: one with respect to the traffic flow coming from the mobile terminal 3 and another one with respect to the traffic flow coming from the mobile terminal 4.

The safety degree estimated by the EM 6 can be chosen in a predetermined range of values. In a simple example, it could be a binary parameter with two possible values: S (for safe) or NS (for non safe). In another example, it could take an integer value between 0 and 5, 0 representing the least safe value and 5 representing the safest value. A real value could also be estimated by the EM 6.

The node 1 further comprises a selection module SM 7. The latter selects at least one security algorithm among the security algorithms 9 implemented in the node 1, depending on the safety degree calculated by the EM 6. The selection is advantageously such that at least one security algorithm with a relatively low security level is selected when the safety degree relating to the node 1 is relatively high, whereas at least one security algorithm with a relatively high security level is selected when the safety degree relating to the node 1 is relatively low.

In the present description, when speaking of selecting a security algorithm with a relatively low security level or a security algorithm with a relatively high security level, it should be understood that these security algorithms can refer either to a same algorithm using different key lengths (e.g. AES 128, AES 256, AES 512, etc.) or to different algorithms (DES, 3-DES, AES, RSA, etc.).

As an example, if the EM 6 has estimated the highest safety degree for the node 1, the SM 7 preferably selects one or several of the algorithms $A_0$, $C_0$ and $I_0$ which have the lowest security level. Indeed, there is no need to over-secure the node 1 which is already very safe.

By contrast, if the EM 6 has estimated the lowest safety degree for the node 1, the SM 7 preferably selects one or several of the algorithms $A_n$, $C_m$ and $I_p$ which have the highest security level. Indeed, it is necessary to strongly secure the node 1 which is very unsafe.

An activation module AM 8 of the node 1 then activates the security algorithms selected by the SM 7. Thus, the security algorithms selected are applied to all or part of the traffic routed by the node 1. For example, an authentication algorithm $A_i$ chosen among $(A_0, A_1, \ldots, A_n)$ can be processed by the node 1. Similarly, a ciphering algorithm $C_j$ chosen among $(C_0, C_1, \ldots, C_m)$ can be processed to cipher the traffic routed from the mobile terminal 3 and/or the mobile terminal 4 to the other system 2 and an integrity $I_i$ algorithm chosen among $(I_0, I_1, \ldots, I_p)$ can be processed to allow checking the validity of the traffic routed from the mobile terminal 3 and/or the mobile terminal 4 to the other system 2 for instance.

In this way, the security level applied to the traffic routed by the node 1 is adapted to the actual and current situation in terms of safety.

It should be noted that when the EM 6 estimates several safety degrees, relating to different traffic flows for instance, the SM 6 selects and the AM 8 then activates several security algorithms accordingly. The appropriate security algorithms are thus applied to the traffic flows, so that their security levels correspond to the respective safety degree estimates.

It may happen that no algorithm implemented in the node 1 is secure enough to overcome its lack of safety. For instance, if the safety degree estimated by the EM 6 is too low, e.g. if it reveals an amount of attacks above a determined threshold, even the security algorithms $A_n$, $C_m$ and $I_p$ may be insufficient to come to a safe situation. In this case, the node 1 could be simply disabled. The disablement can be only partial, for instance when the too low safety degree estimated relates to only one traffic flow among several flows. The other flows could still be routed by the node 1.

Figure 2:
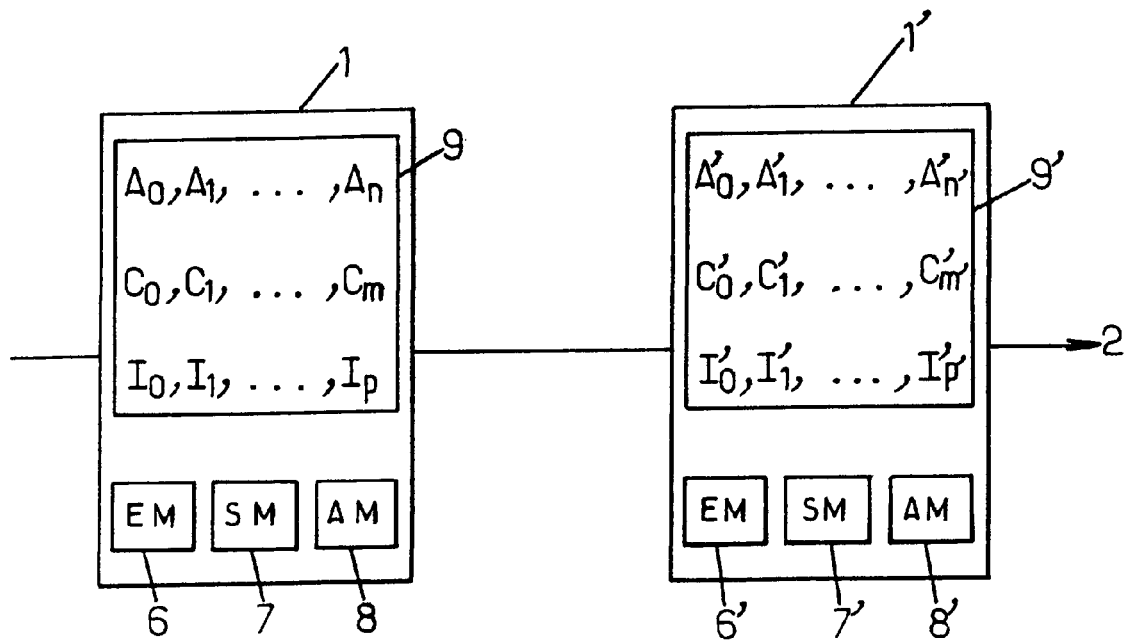
FIG. 2 shows a multi nodes communication system in which the invention can take place.

FIG. 2 shows another communication system implementing the present invention. This system comprises two nodes. One of the nodes can be the node 1 of FIG. 1. The other node 1' is connected to the node 1 by an appropriate link. Traffic may be received by the node 1, routed from the node 1 to the node 1' and then routed to another system 2. Reverse traffic could also be received by the node 1' from the system 2, routed from the node 1' to the node 1 and then possibly further routed by the node 1.

Advantageously, the nodes 1 and 1' form whole or part of an Ambient network.

The node 1' is similar to the node 1 in that it implements a plurality of security algorithms 9', such as authentication algorithms $(A'_0, A'_1, \ldots, A'_{n'})$, ciphering algorithms $(C'_0, C'_1, \ldots, C'_{m'})$ and integrity algorithms $(I'_0, I'_1, \ldots, I'_{p'})$, where n', m' and p' represent integers. Some or all of these algorithms can be identical or similar to the ones $(A_0, A_1, \ldots, A_n)$, $(C_0, C_1, \ldots, C_m)$ and $(I_0, I_1, \ldots, I_p)$ implemented by the node 1. But some others can differ therefrom.

The node 1' also includes estimation, selection and activation modules, EM 6', SM 7' and AM 8' respectively, which are equivalent to the ones of the node 1.

In order to activate some of the security algorithms 9 and 9', each one of the nodes 1 and 1' may take account of the safety of the other node, in addition to its own safety. Indeed, even if the node 1' is considered safe in itself, e.g. because it is located in a safe place, the fact that the node 1 may be unsafe could have an impact on the node 1'. Hackers capable of attacking the unsafe node 1 could indeed also attack the node 1', especially if the traffic exchanged between the two nodes is not protected.

When assuming that the safety degree SD1 relating to the node 1 has already been estimated by the EM 6, the EM 6' may estimate the safety degree SD1' relating to the node 1' by taking SD1 into account.

As an example, SD1' may be calculated according to the formula: $(1-a).SD1+a.RSD1'$, where a is a real factor between 0 and 1 and RSD1' is a rough estimation of the safety degree of the node 1' which is independent from the node 1. For example, RSD1' may be a rough estimation of the amount of malicious attempts to access the node 1' as explained above.

To this end, the node 1 may send its related safety degree SD1 to the node 1'. The transmission can be directly addressed to the node 1', but it can also consist in a broadcast for instance. Alternately, the node 1' could be provided with the value SD1 in another way, e.g. by asking a central database storing the safety degrees of all the nodes of the communication system.

In this way, the safety degree of each node of the communication system can be determined in cooperation with other nodes of the system.

If SD1 changes in time, in particular if the node 1 moves or if the number of malicious attempts to the node 1 increases quickly, SD1' could be modified accordingly. To achieve this, the node 1 advantageously informs the node 1' of the change, with an alert message for instance.

More generally, a given node may inform other surrounding nodes about its current safety degree using any cast (or point to point) messaging. This invention does not mandate a particular solution to achieve this. Other means such as the use of existing broadcast or routing protocols such as OSPF (Open Shortest Path First) may also be used to propagate this information.

In each one of the nodes 1 and 1', appropriate security algorithms among $(A_0, A_1, \ldots, A_n)$, $(C_0, C_1, \ldots, C_m)$, $(I_0, I_1, \ldots, I_p)$ and $(A'_0, A'_1, \ldots, A'_{n'})$, $(C'_0, C'_1, \ldots, C'_{m'})$, $(I'_1, I'_1, \ldots, I'_{p'})$ respectively, are selected depending on SD1 or SD1' and activated as explained above with reference to FIG. 1.

When the security algorithms to be activated apply to both nodes 1 and 1', which can happen for instance for mutual authentication or ciphering in both directions, the same or compatible security algorithms should preferably be activated in the nodes, even if SD1 and SD1' are slightly different. Alternatively, the estimation modules EM 6 and 6' choose SD1 and SD1' so that the corresponding security algorithms implemented by the node 1 and the node 1' respectively are the same or compatible (e.g. SD1=SD1').

Figure 3:
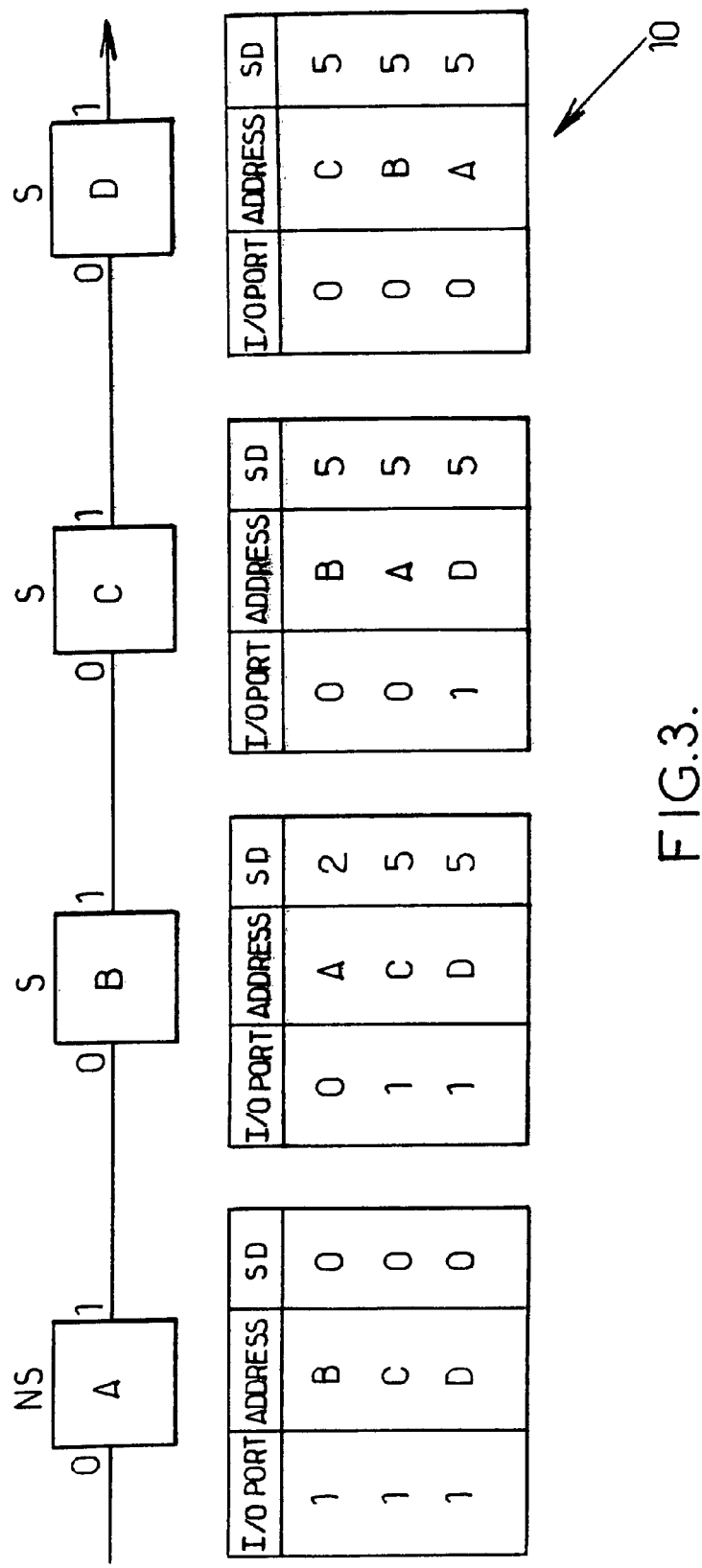
FIG. 3 shows a more complex communication system in which the invention can take place.

FIG. 3 shows an application of the present invention to another communication system including more nodes than in the above examples. Actually, this system comprises four nodes A, B, C and D connected two by two in a chain. Of course, other architectures are also possible. In particular, the nodes could be arranged in a mesh, i.e. more than two nodes could be connected to a given node of the system.

In such complex system, a level 3 routing can be performed between the nodes. To this end, a routing protocol such as AODV (Ad hoc On-demand Distance Vector) can be used for instance.

Each node of the system comprises an input port 0 and an output port 1. In this example, the traffic to be routed is assumed to enter the communication system through the node A and then to leave the communication system through the node D after having gone through the nodes B and C.

It should be noted that in the present description, the term "port" relates to a logical and not a physical notion. The port may identify a given application for instance.

As illustrated in FIG. 3, the node A is considered non safe (NS), whereas the nodes B, C and D are considered safe S.

Each node of the system operates as explained above. In particular, it holds one safety degree per traffic flow, which is in the range {0, 1, 2, 3, 4, 5}, where 0 represents the least safe value and 5 represents the safest value A routing table 10 is provided for each one of the nodes A-D. It indicates for each flow represented by an input or output port and an address of the next node, the respective safety degree. The safety degrees are estimated as described above. In particular, the safety degree of each node can take account of at least one other node of the system.

As an example, the safety degree SD=0 is estimated for each traffic flow routed from the node A to any one of the nodes B, C or D. SD=0 may be such that authentication, ciphering as well as integrity are reinforced compared to SD=5. Indeed, since the node A is considered non safe, the outgoing flows must be secured.

As another example, the safety degree SD=5 is estimated for the traffic flow routed from the node B to the node C or D, since each one of the nodes B-D is considered safe. The safety degree SD=2 is estimated for the traffic flow routed from the node A to then node B, since the node A is considered unsafe while the node B is considered safe. SD=2 may be such that only the data integrity is reinforced compared to SD=5 (but not the ciphering for instance), because the data coming from the unsafe node A may be corrupted before they are received at the node B.

The security algorithms corresponding to the determined safety degrees are selected among the ones implemented by each node and activated as described above.

Some or all the operations described above can be carried out by virtue of a computer program product loaded and executed in some or all the nodes of the communication system.

We claim:

1. A communication system comprising a plurality of nodes, each node capable of routing traffic in a communication system according to a plurality of security algorithms with respective security levels and comprising:
   an estimation module for estimating at least one safety degree relating to the each node;
   a selection module for selecting at least one security algorithm of the plurality of security algorithms, depending on the safety degree estimated by the estimation module; and
   an activation module for activating the at least one security algorithm selected by the selection module,
   wherein each node is connected to at least another node of the plurality of nodes.

2. The communication system as set forth in claim 1, wherein the selection module is arranged for selecting at least one security algorithm with a relatively low security level when the estimated safety degree is relatively high and for selecting at least one security algorithm with a relatively high security level when the estimated safety degree is relatively low.

3. The communication system as set forth in claim 1, wherein the security algorithm of the plurality comprise at least one of authentication, ciphering, or integrity algorithms.

4. The communication system as set forth in claim 1, wherein the estimation module takes account of a type of location in which the each node is placed.

5. The communication system as set forth in claim 1, wherein the estimation module takes account of a number of security attacks the each node faced in a previous time period.

6. The communication system as set forth in claim 1, wherein the estimation module takes account of a type of security attacks the each node faced in a previous time period.

7. The communication system as set forth in claim 1, wherein the estimation module takes account of subscription or equipment characteristics to which at least part of the traffic to be routed by the each node relates.

8. The communication system as set forth in claim 1, wherein the traffic to be routed by the node comprises a plurality of flows and wherein the estimation module is arranged for estimating a safety degree for each of the plurality of flows respectively.

9. The communication system as set forth in claim 1, comprising means for at least partially disabling the node when the estimated safety degree is below a predetermined value.

10. The communication system as set forth in claim 1, wherein the node is arranged for being connected to at least another node of the communication system, and wherein the estimation module is arranged for estimating the safety degree by taking account of a safety degree relating to at least the other node.

11. The communication system as set forth in claim 10, comprising a sending module for sending at least another node of the communication system an estimated safety degree related to the at least another node.

12. The communication system as set forth in claim 10, comprising means for detecting a change in the related estimated safety degree and means for informing at least another node of the communication system accordingly.

\* \* \* \* \*